United States Patent [19]

Aiuola et al.

[11] Patent Number: 4,566,491

[45] Date of Patent: Jan. 28, 1986

[54] VALVE ESPECIALLY SUITABLE FOR USE IN FILLING MACHINES

[75] Inventors: Franco Aiuola; Paolo Nipoti, both of Bologna, Italy

[73] Assignee: Azionaria Costruzioni Macchine Automatiche - A.C.M.A. - S.p.A., Bologna, Italy

[21] Appl. No.: 571,776

[22] Filed: Jan. 18, 1984

[30] Foreign Application Priority Data

Jan. 28, 1983 [IT]  Italy ................................ 3323 A/83

[51] Int. Cl.<sup>4</sup> .............................................. G01F 11/04
[52] U.S. Cl. ........................... 137/625.66; 137/625.68; 222/249; 222/250
[58] Field of Search ......................... 91/305, 306, 466; 222/249, 250; 141/145-150; 137/625.68, 625.66

[56] References Cited

U.S. PATENT DOCUMENTS 3,095,176  6/1963  Hunt ...................................... 251/62
3,249,122  5/1966  Fleckenstein et al. ......... 137/625.38
3,518,032  6/1970  Degroff et al. ...................... 251/62

FOREIGN PATENT DOCUMENTS 2835460  12/1978  Fed. Rep. of Germany ...... 222/249
698772   2/1931   France ............................. 137/625.68

Primary Examiner—Carroll B. Dority, Jr.
Attorney, Agent, or Firm—H. Samuel Kieser

[57] ABSTRACT

Valve 11 includes a slide sliding in a first chamber 26 with the possibility of reaching two stable end positions opposite each other. In the first position the slide 21 allows intercommunication between a conduit 6 for supply of the product from a supply source and conduit 12 communicating with the upper part of chamber 10 of a double acting piston 9, as well as the intercommunication of the other part of chamber 10 with a conduit 15 connected to a delivery apparatus; in the second position the slide allows the reversal of such connections. To avoid the infiltration and mixing of the fluid under pressure used for the control of valve 11 in the conduits in which the product circulates, said slide 21 is equipped with a projection 35 which extends beyond one of the ends of the chamber 26 and is connected to a small pneumatically controlled piston 36, sliding in a second chamber 37, separate from the first.

2 Claims, 3 Drawing Figures

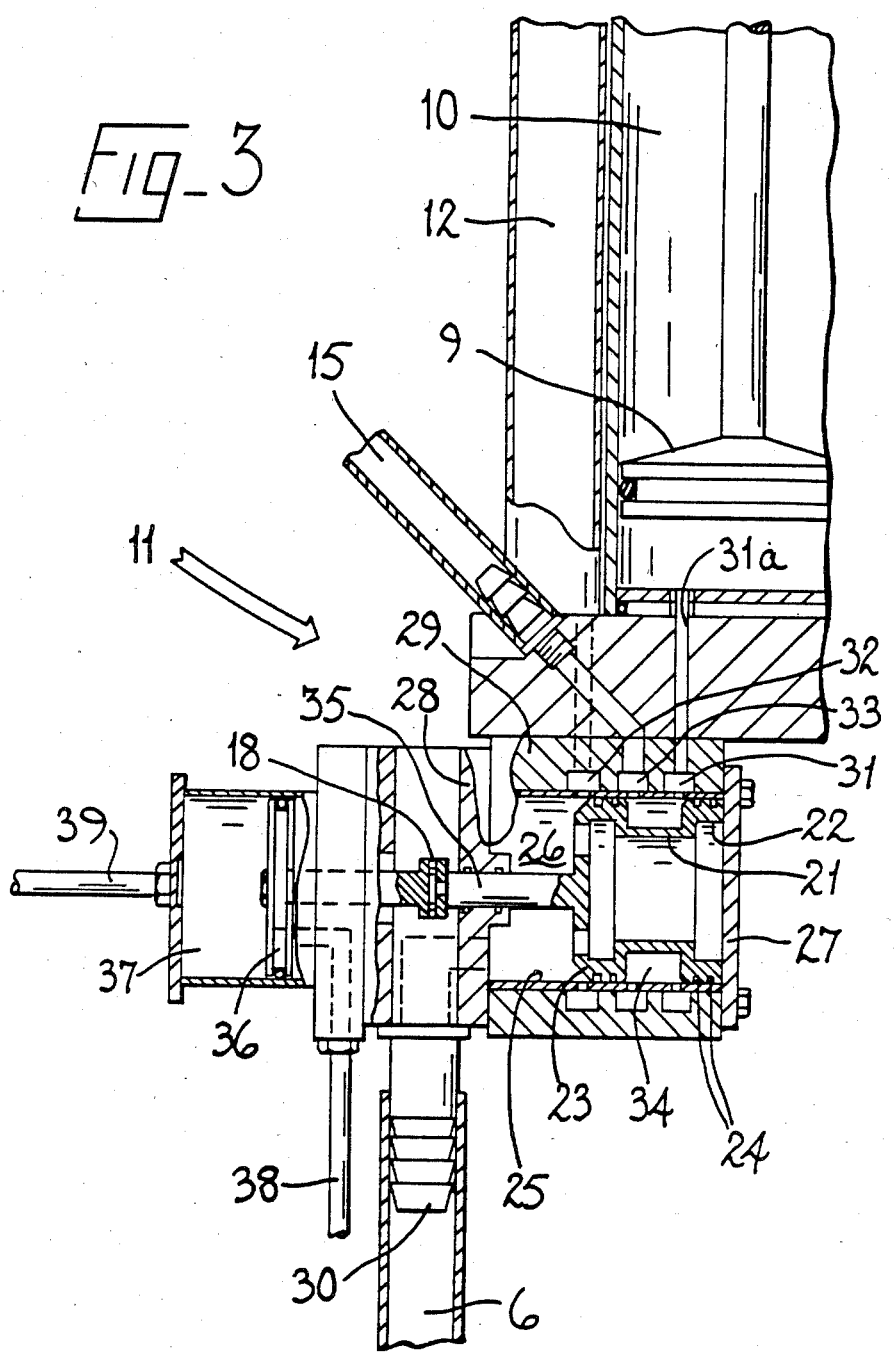
Fig_3

VALVE ESPECIALLY SUITABLE FOR USE IN FILLING MACHINES

FIELD OF THE INVENTION

The present invention is concerned with valves especially suitable for use in filling machines, namely machines for filling bottles (and similar containers) with liquid and semi-liquid products.

BACKGROUND OF THE INVENTION

In some heretoforeknown filling machines the dosage (metering) of the products, during filling of the containers, is carried out by a dosage device comprising a double-acting piston sliding in a cylindrical chamber into which the product is made to pass before it can reach the delivery apparatus. The dosage of the product is directly dependent on the displacement of the double acting piston and on the consequent variation of volume in the two parts of the cylindrical chamber which are at one at either side of the piston; in the phase where the product is drawn into one part of the chamber there is an outflow of the product from the other part of the chamber. Machines of the type described provided with dosage delivery means are already well known on the market and their names are known to those skilled in the art of volumetric filling machines.

One problem, among others, which the machine manufacturers have had to face has been that of reducing, so far as possible, errors in the dosage of the product.

The accuracy of the dosage, in known machines, is extremely sensitive to loss of sealing of the various parts of the apparatus for the control and distribution of the product (with consequent loss of product) and also infiltration of foreign fluids into the conduits for the feeding and distribution of the product from the feeding source to the dosage delivery apparatus. Possible infiltrations, of air for example, may in fact be the cause of variations by reduction of the flow of the product into the dosage apparatus, with consequent errors in dosage. In order not to have, on discharge from the known filling machines, containers filled with a quantity of the product even slightly less than that required (for many products the total contents must be declared on the label which marks them), users of such machines usually resort to a setting in excess of the volumetric quantity of the product required. For low cost products this setting leads to negligible (or at least tolerable) losses in relation to production costs, but in the case of more expensive products over long operative periods, the cost can be considerable.

In attempting to solve the problem of dosage control particular attention has been paid to sealing, for example in the valves for control and distribution of the product to the dosage/delivery apparatus. Thus particular valves suitable for use in a dosage/delivery apparatus, have been proposed, commonly known by the term "spool valve". Such valves include a generally cylindrical body sliding inside a cylindrical chamber into which open both supply conduit for the fluid to be dosed (metered) and the conduit for feeding the product to the dosage apparatus and then to the delivery apparatus. Such a cylindrical body, or slide, is shaped in such a way as to present regions of reduced diameter which define corresponding chambers (generally three) which in conjunction with the position of the slide inside the cylindrical chamber, allow the intercommunication with each other of the above-mentioned conduits, to obtain the operative phases of dosage and delivery. In some cases the parts of the slide which delimit said chambers are equipped with one or more peripheral sealing rings designed to seal against the internal walls of the cylindrical chamber as the slide slides to and fro in the chamber; in others the cylindrical chamber has annular seatings in which sealing rings are housed to seal against those surfaces of the parts of the slide which are not of a reduced diameter. Such valves are normally operated pneumatically by admitting air under pressure directly into the cylindrical chamber so as to cause axial strokes of the slide to and fro inside the cylindrical chamber. In the presence of fluid products with chemically corrosive characteristics, or fluid products with aggressively abrasive characteristics, sealing elements are subject to rapid wear, giving rise to the disadvantages described above. These disadvantages are more likely to arise in high-speed filling machines equipped with multiple dosage/delivery devices and where there is a considerable operating pressure both in the control and distribution circuits for the product and in the pneumatic control circuits for the valves associated with the various dosage/delivery devices.

OBJECT OF THE INVENTION

An object of the present invention is to provide a valve suitable for use in controlling the flow of fluid products in volumetric filling machines which is of simple and economic construction and reliable operation.

SUMMARY OF THE INVENTION

The above and other objects are achieved by having a slide valve suitable for use in controlling the flow of fluid products in volumetric filling machines, comprising a valve slide which slides inside a first closed cylindrical chamber and has a projection which extends through a sealed passage in one of the ends of the cylindrical chamber, the projection being connected to a double-acting piston controlled by fluid under pressure, the double-acting piston sliding inside a second cylindrical chamber separated and sealed from the first.

A preferred valve has a spool-shaped valve slide with two opposite end shoulders, a slide valve comprising a valve slide which is spool-shaped and has two opposite end shoulders provided peripherally with means for sealing against the internal walls of a first cylindrical chamber in which the slide is slideable, said shoulders delimiting a part of the slide of reduced section which forms a sealed region for the passage of fluid product, said slide being hollow inside and open at either end so as to be internally in direct communication with the first cylindrical chamber, an inlet to the first cylindrical chamber for a product supplied from a supply source, the inlet being located in a position in which it cannot be blocked by the slide during its displacements, an outlet for the product to delivery apparatus which opens into the sealed region delimited by the shoulders of the slide, and first and second ports for the product which, dependent on the position of the slide, can be arranged at successive times, with the first port in communication with the inlet for the product into the cylindrical chamber whilst the second port is in communication with the outlet through the sealed region delimited by the shoulders of the slide, or with the second port in communication with the inlet for the product and the first port in communication with the outlet, through the sealed region. The first and second ports are conveniently connected, by commonly known techniques, to chambers formed at either side of the double-acting piston of a dosage apparatus.

The first and second ports are conveniently connected, by commonly known techniques, to chambers formed at either side of the double-acting piston of a dosage apparatus. The clear separation of the first and second cylindrical chambers of the preferred valve as set out in the last preceding paragraph but one substantially reduces risk of possible infiltrations of air (or of other fluids) into the circuit for control and distribution of the product, and furthermore allows the activation of the valve using only moderate pressures in the activating circuit, to the advantage of the operative speed of the valve and without this effecting the circuit for control and distribution of the product. Additionally the number of sealing elements necessary is also reduced by utilising the same cylindrical chamber for the distribution of the product to the various conduits, with consequent reduction of risk of leakage and thus of product loss.

The simple spool shape of the valve slide of a valve according to the invention requires the use of a minimum number of sliding sealing elements with benefits in production costs and maintenance of the valve. Furthermore by being able to fully utilize the cylindrical chamber in which the valve slide slides for distribution of the product, there is the possibility of obtaining valves of very compact dimensions with the advantage of their easy accommodation in a complex filling machine.

BRIEF DESCRIPTION OF THE DRAWINGS

There now follows a detailed description, to be read with reference to the accompanying drawings, of a filling machine including a valve embodying the invention. It will be realized that this machine has been selected for description to illustrate the invention by way of example and not of limitation of the invention.

In the accompany drawings:

FIG. 3 is a side view partly in section, of the valve.

DESCRIPTION OF THE PREFERRED EMBODIMENT

Figure 1:
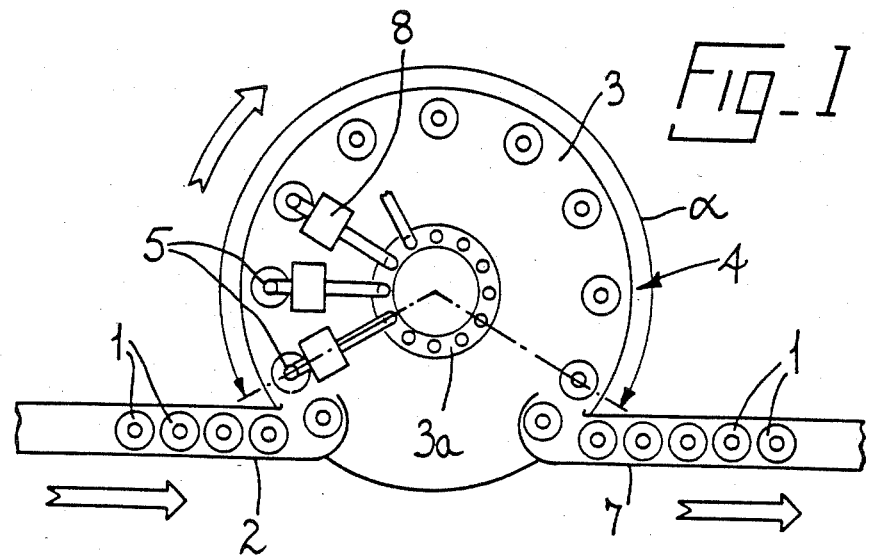
FIG. 1 is a diagrammatic view of the machine embodying the invention showing the path followed by bottle-type containers to be filled in the operation of the machine.

Containers 1 to be filled for example bottles arriving from a supply line 2 (see FIG. 1) are guided, suitably spaced from one another, to rest on a rotating transport platform 3 which forms part of the filling machine 4. The machine 4 is generally of know construction and comprises a series of dosage/delivery units 5 for the product with which the containers are to be filled. Such units 5 are supported above and for rotation with the transport platform 3 at a height which is adjustable, dependent upon the height of the containers 1, and are individually connected to a central core (or revolving distributor) 3a of the transport platform 3 to supply all the connections necessary for their operation, for example feeding conduits 6 for supplying the fluid product from a feed tank (not shown) to individual units 5.

The filling of a container 1 takes place in the period of time required for the transport of the container from an entry area of the machine to an outlet station spaced from the former by an angle indicated by "a" in FIG. 1; from the outlet station the filled containers pass from the transport platform 3 to a discharge line 7 to be conveyed to successive stations or machines which provide for, for example, the checking of the weight of the containers and their packaging in cartons or the like.

Figure 2:
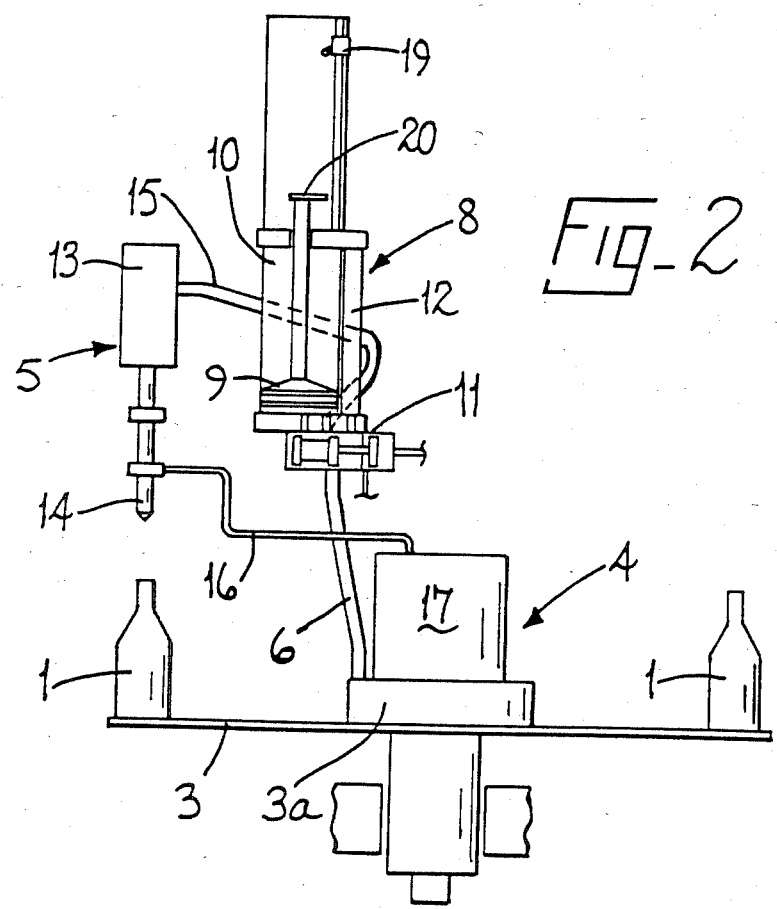
FIG. 2 is a diagrammatic side view showing a dosage/delivery unit of the machine.

In FIG. 2 a dosage/delivery unit 5 includes dosage apparatus 8 equipped with a doubled-acting piston 9, sliding inside a cylindrical chamber 10 communicating with a valve 11, for the control and distribution of the product, by means of two passages of which one opens into a lower part and the other by means of a conduit 12, into an upper part of the cylindrical chamber 10, one at either side of the piston 9. Each dosage/delivery unit 5 also comprises delivery apparatus 13 which is supported in such a way as to traverse vertically in two directions, towards containers resting on the transport platform 3 to a lower position in which a delivery nozzle 14 is connected to a mouth of the container, or towards a raised position in which the nozzle 14 is remote from the mouth of the container 1.

The delivery apparatus 13 is not described in detail as it is commonly known to those skilled in the art; it is connected to the valve 11 by means of a conduit 15 through which the dosed (measured) product passes from the dosage apparatus 8 to the delivery apparatus 13. The delivery nozzle 14 is connected by means of a conduit 16 to a tank 17 and to a suction apparatus (not shown) to avoid dripping of the product at the end of the filling phase of a container 1. The units 5 also comprise a two-way valve 19 which can be operated by a striker 20 connected to the rod of the piston 9, during the displacement of the piston 9 inside the cylindrical chamber 10. The valve 19 forms part of a pneumatic circuit for controlling and activation of the valve 11 and its position is adjustable lengthwise of the chamber 10.

The valve 11 (see FIG. 3) comprises a slide 21, substantially spool-shaped, with two end shoulders 22, 23 at opposite ends, the shoulders 22, 23 having peripheral sealing rings 24 which seal against an internal surface of a cylindrical liner 25 defining a cylindrical chamber 26 in which the slide 21 slides axially. The cylindrical chamber 26 is closed at its ends by means of two members 27, 28 fixed to a housing 29 of the valve 11; the housing 29 is equipped with a pipe union 30 to which one of the conduits 6 is connected, for the connection of the valve 11 to the central core 3a: the union 30 thus provides an inlet to the chamber 26 which cannot be blocked by the slide 21. The housing 29 further comprises three annular recesses 31, 32, 33 of which the recess 31 communicates with the lower part of the cylindrical chamber 10 of the dosage apparatus 8 by means of a channel 31a. The recess 32 communicates with the conduit 12 and the recess 33 communicates with the conduit 15 which connects the valve 11 to the delivery apparatus 13. A series of holes corresponding with these recesses, viz an outlet leading to the recess 33 and first and second ports leading to the recesses 31, 32 respectively, in the cylindrical liner 35, allow the passage of the product from the chamber 26 to the recesses 31, 32, 33. The shoulders 22, 23 of the slide 21 define a sealed region, viz a sealed recess 34, through which at successive times and dependent on the position of the slide 21, the recesses 31, 33 and 32, 33 may be put into communication.

The slide 21 is hollow inside and is internally in free communication with the cylindrical chamber 26. The slide 21 is dimensioned in such a way that when the recesses 31, 33 are in intercommunication with each other via the recess 34, the recess 32 is in free communication with the cylindrical chamber 26; when the recesses 32, 33 are in intercommunication with each other via the recess 34, however, the recess 31 is in free communication with the cylindrical chamber 26.

The slide 21 has an axial, stem-like projection 35 which extends through a sealed passage in the flange 28 and is connected to a rod of a pneumatically controlled piston 36 sliding inside a cylindrical chamber 37 connected by two conduits 38, 39 to a compressor apparatus (not shown in the drawings). A coupling 18 connects the projection 35 with the piston rod 36 and allows, if necessary, the separation of the chamber 37 and piston 36 from the housing 29 without the necessity for the disassembly of the valve 11. The working of the valve 11 will be apparent from the above description and is outlined hereinafter.

Starting, for example, from the condition in which the valve 11 is shown in FIG. 3 but with the piston 9 in a lower most position in the chamber 10 (contacting a bottom of the chamber), when the filling cycle of a container is initiated (which is effected by parts of the machine, not shown in the drawings, which detect the presence of a container under the delivery nozzle 14) air under pressure is supplied to the chamber 37 through a conduit 38 and consequently the piston 36 traverses to the left, viewing FIG. 3, carrying with it the slide 21. In this situation the lower part of the cylindrical chamber 10 is put into communication with the chamber 26 and thus conduit 6, through the recess 31 and the interior of the slide 21. The product under pressure supplied through the conduit 6 then begins to move the piston 9 upwardly and thus the product is discharged from the upper part of the chamber 10 through the conduit 12, recesses 32, 33 and conduit 15 to the delivery apparatus 13 by which it is discharged into the container 1. When the striker 20 actuates the two-way valve 19 (which detects the position of desired maximum upward movement of the piston 9) the conduit 38 is put on discharge and air under pressure is supplied to the chamber 37 through the conduit 39. Consequently there is a movement of the piston 36 to the right, viewing FIG. 3, and the slide 21 returns to the starting position in which it is shown in FIG. 3 of the drawings.

The piston 9 then begins to move downwardly and the product which filled the lower part of the chamber 10 during discharge of the upper part of the chamber 10 is itself discharged through the recesses 31, 34, 33 and the conduit 15 to the delivery apparatus 13. The filling cycle ends when the piston 9 reaches its lower most position.

It is evident that the volumetric dosage of the product depends on the position of the valve 19. The adjustable position of the valve 19 allows variation of the stroke of the piston 9 and thus variation of the dosage of the product to be delivered in a filling cycle which consists of an upward and a downward stroke of the piston 9.

It can also be seen from the above description and especially from FIG. 3 of the drawings that the chamber 37 is physically separated from the chamber 26 and that, therefore, there is no risk of air under pressure from the chamber 37 infiltrating into the chamber 36 and contaminating the product therein.

Having thus described our invention, what we claim as new and desire to secure by Letters Patent of the United States is:

1. A slide valve suitable for use in controlling the flow of fluid products in volumetric filling machines, comprising a valve slide which slides inside a first closed cylindrical chamber and has a projection which extends through a sealed passage in one of the ends of the cylindrical chamber, the projection being connected to a double-acting piston controlled by fluid under pressure, the double-acting piston sliding inside a second cylindrical chamber separated and sealed from the first, said valve slide being spool-shaped and having two opposite end shoulders provided peripherally with means for sealing against the internal walls of said first cylindrical chamber in which the slide is slideable, said shoulder delimiting a part of the slide of reduced section which forms a sealed region for the passage of fluid product, said slide being hollow inside and open at either end so as to be internally in direct communication with the first cylindrical chamber, an inlet to the first cylindrical chamber for a product supplied from a supply source, the inlet being located in a position in which it cannot be blocked by the slide during its displacements, and outlet for the product to delivery apparatus which opens into the sealed region delimited by the shoulders of the slide, and first and second ports for the product, said slide being movable by said piston between first and second positions, in said first position said inlet being in communication with said first port and said reduced section providing communication between said second port and said outlet, and in said second position, said inlet being in communication with said second port and said reduced section providing communication between said first port and said outlet.

2. A slide valve according to claim 1 in which the projection is connected to the piston by a coupling, the construction and arrangement being such that the second chamber and piston may be separated from the first chamber projection without disassembling the valve.

* * * * *